(12) United States Patent
Monteith

(10) Patent No.: US 11,912,339 B2
(45) Date of Patent: Feb. 27, 2024

(54) 3-D PRINTED CHASSIS STRUCTURE WITH SELF-SUPPORTING RIBS

(71) Applicant: DIVERGENT TECHNOLOGIES, INC., Los Angeles, CA (US)

(72) Inventor: Eric Paul Monteith, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 358 days.

(21) Appl. No.: 16/740,254

(22) Filed: Jan. 10, 2020

(65) Prior Publication Data

US 2021/0214013 A1 Jul. 15, 2021

(51) Int. Cl.
| | |
|---|---|
| B62D 25/08 | (2006.01) |
| B62D 29/04 | (2006.01) |
| B29C 64/153 | (2017.01) |
| B29L 31/30 | (2006.01) |
| B33Y 80/00 | (2015.01) |

(52) U.S. Cl.
CPC ............. B62D 25/08 (2013.01); B62D 29/04 (2013.01); *B29C 64/153* (2017.08); *B29L 2031/3002* (2013.01); *B33Y 80/00* (2014.12)

(58) Field of Classification Search
CPC ........ B62D 25/08; B62D 29/04; B33Y 80/00; B29C 64/153
USPC ....................................................... 296/205
See application file for complete search history.

(56) References Cited

U.S. PATENT DOCUMENTS

| | | | |
|---|---|---|---|
| 5,203,226 | A | 4/1993 | Hongou et al. |
| 5,742,385 | A | 4/1998 | Champa |
| 5,990,444 | A | 11/1999 | Costin |
| 6,010,155 | A | 1/2000 | Rinehart |
| 6,096,249 | A | 8/2000 | Yamaguchi |
| 6,140,602 | A | 10/2000 | Costin |
| 6,250,533 | B1 | 6/2001 | Otterbein et al. |

(Continued)

FOREIGN PATENT DOCUMENTS

| | | |
|---|---|---|
| WO | 1996036455 A1 | 11/1996 |
| WO | 1996036525 A1 | 11/1996 |

(Continued)

OTHER PUBLICATIONS

US 9,202,136 B2, 12/2015, Schmidt et al. (withdrawn)

(Continued)

*Primary Examiner* — Dennis H Pedder
(74) *Attorney, Agent, or Firm* — ARENTFOX SCHIFF LLP

(57) ABSTRACT

Self-supporting 3-D printed chassis structures are disclosed. Self-supporting ribs are selectively printed to walls of the structure to meet desired dynamic stiffness targets while maintaining a reduced mass. The self-supporting ribs can be used as both support structures (e.g., for outer walls) during 3-D printing and as stiffening structures when the chassis structure is in operation. In an embodiment, the chassis structure is printed such that no support structures are needed. Topology optimization can enable remaining unneeded internal ribs or supports to be removed, and a high inner spatial volume between ribs can be maintained to make maximum use of the part. In various embodiments, wall thicknesses can be maintained at or below 1-2 millimeters, which further reduces mass.

17 Claims, 7 Drawing Sheets

(56) References Cited

U.S. PATENT DOCUMENTS

| | | |
|---|---|---|
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,052,184 B2 * | 11/2011 | Braunbeck ............... B60R 19/34 |
| | | 293/133 |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |

(56) References Cited

U.S. PATENT DOCUMENTS

| | | |
|---|---|---|
| 9,898,776 B2 | 2/2018 | Apsley et al. |
| 9,914,150 B2 | 3/2018 | Pettersson et al. |
| 9,914,490 B2 * | 3/2018 | Schauerte ............ B62D 29/002 |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |

(56) References Cited

U.S. PATENT DOCUMENTS

| | | |
|---|---|---|
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2014/0277669 A1 | 9/2014 | Nardi et al. |
| 2014/0300126 A1 | 10/2014 | Ehrlich et al. |
| 2017/0057558 A1 | 3/2017 | Hillebrecht et al. |
| 2017/0113344 A1 | 4/2017 | Schönberg |
| 2017/0341309 A1 | 11/2017 | Piepenbrock et al. |
| 2018/0251163 A1* | 9/2018 | Martin .................. B22F 5/10 |
| 2019/0030605 A1 | 1/2019 | TenHouten et al. |
| 2019/0351641 A1 | 11/2019 | Massey |
| 2019/0351642 A1 | 11/2019 | Zafar |
| 2020/0406984 A1* | 12/2020 | Edag ................ B62D 27/026 |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |
| WO | 2019223935 A1 | 11/2019 |

OTHER PUBLICATIONS

US 9,809,265 B2, 11/2017, Kinjo (withdrawn)
US 10,449,880 B2, 10/2019, Mizobata et al. (withdrawn)
International Search Report received in corresponding PCT Application No. PCT/US20/67522 dated Mar. 30, 2021.
Notification of Transmittal of the International Search Report and Written Opinion received in corresponding PCT Application No. PCT/US20/67522 dated Mar. 20, 2021.

* cited by examiner

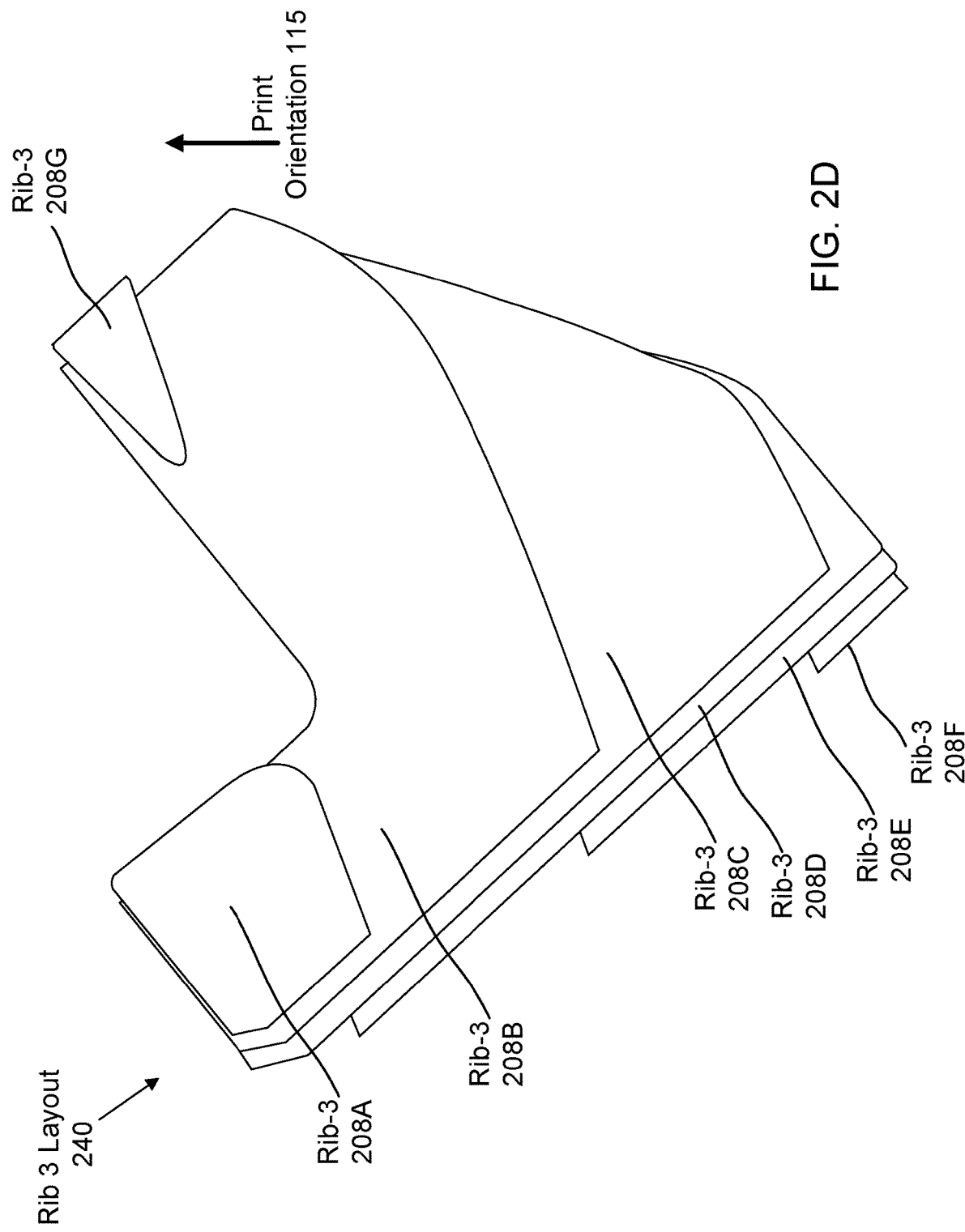

3-D PRINTED CHASSIS STRUCTURE WITH SELF-SUPPORTING RIBS

BACKGROUND

Field

The present disclosure relates generally to three-dimensional (3-D) printed chassis structures, and more specifically to 3-D printed chassis structures with internal self-supporting ribs.

Background

3-D printing systems can produce structures, referred to as build pieces, with geometrically complex shapes, including some shapes that are difficult or impossible to create with conventional manufacturing processes. Powder bed fusion (PBF) systems, for example, create build pieces layer by layer. Each layer or 'slice' is formed by depositing a layer of powder and exposing portions of the layer to an energy beam. The energy beam is applied to melt areas of the powder layer that coincide with the cross-section of the build piece in the layer. The melted powder cools and fuses to form a slice of the build piece. Each layer is deposited on top of the previous layer. The resulting structure is a build piece assembled slice-by-slice from the ground up.

Conventional chassis structures, such as portions of the frame of a vehicle, are typically cast, extruded or stamped. The walls of these chassis structures are conventionally cast very thick to accommodate dynamic stiffness requirements of the chassis. However, the overall mass of these chassis structures can be significant, decreasing the vehicle's overall performance and fuel economy.

SUMMARY

In various aspects, a three-dimensional (3-D) printed chassis structure includes a wall, and a plurality of self-supporting ribs coupled to an inner surface of the wall.

In various aspects, a 3-D printed chassis structure includes a plurality of nodes, each node comprising a wall and a plurality of self-supporting ribs coupled to an inner surface of the wall.

Other aspects will become readily apparent to those skilled in the art from the following detailed description, wherein is shown and described only several embodiments by way of illustration. As will be realized by those skilled in the art, concepts herein are capable of other and different embodiments, and several details are capable of modification in various other respects, all without departing from the present disclosure. Accordingly, the drawings and detailed description are to be regarded as illustrative in nature and not as restrictive.

BRIEF DESCRIPTION OF THE DRAWINGS

Various aspects of 3-D printed chassis structures that achieve dynamic stiffness requirements while minimizing mass will now be presented in the detailed description by way of example, and not by way of limitation, in the accompanying drawings, wherein:

FIGS. 2B-D illustrate perspective views of the internal ribs of the vehicle chassis structure.

DETAILED DESCRIPTION

Figure 1:
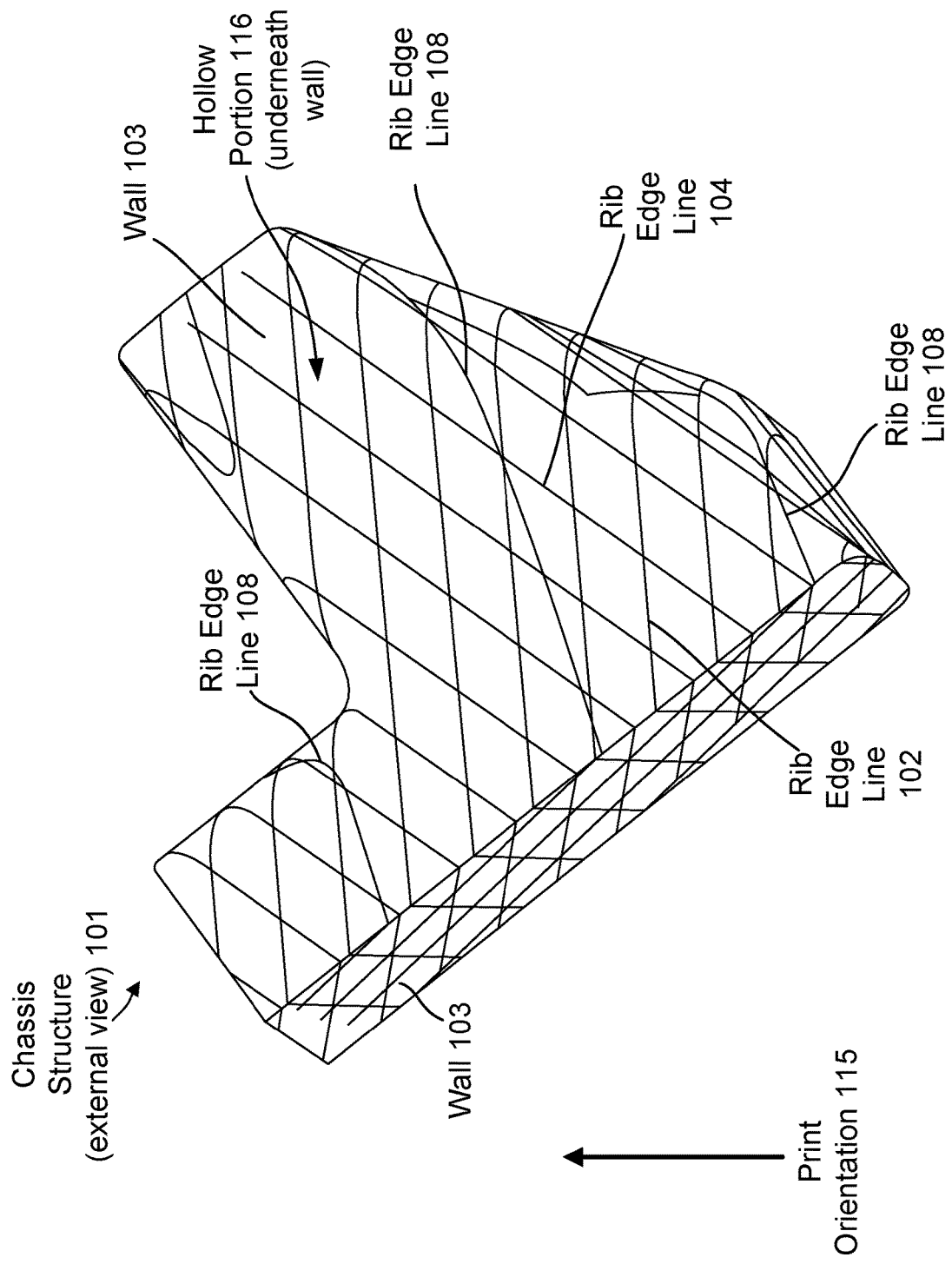
FIG. 1 illustrates a perspective view of a vehicle chassis structure in accordance with an embodiment.

The detailed description set forth below in connection with the appended drawings is intended to provide a description of various exemplary embodiments of the concepts disclosed herein and is not intended to represent the only embodiments in which the disclosure may be practiced. The terms "exemplary" and "example" used in this disclosure mean "serving as an example, instance, or illustration," and should not necessarily be construed as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

Chassis structures such as joints, interconnects, pillars, panel tube assemblies, panel assemblies, rails and beams—to name a few—in a vehicle or other mechanism often require thick external walls and complicated arrays of internal support structures to meet various manufacturer specifications. These specifications can include, for example, stress requirements, durability requirements, and static and dynamic stiffness requirements.

While static stiffness refers to the generic stiffness of a structure upon application of a static force, dynamic stiffness of a structure refers to the stiffness of the structure over an entire range of frequencies to which the structure may be subjected. For example, absent careful attention to dynamic stiffness considerations in the design of a vehicle, the suspension can cause the entire chassis to vibrate or rattle persistently when the vehicle is in motion. To help isolate vehicle occupants from external events such as bumps in the road, uneven roadways and other sudden trauma to the suspension, vehicle manufacturers have paid special attention to the importance of high frequency dynamic stiffness requirements. That is, manufactures have put threshold requirements in place to minimize high order plate modes. High order plate modes can cause high frequency shaking of plates or walls in chassis structures, to which passengers can be particularly susceptible.

One of the biggest challenges faced in addressing dynamic stiffness is meeting stiffness requirements without unduly increasing the mass of the chassis structures. Due to high order plate modes of the external walls of these chassis structures, manufacturers are often required to make the outer walls (also known as "skins") of chassis structures relatively thick. Given that many vehicle manufacturers rely on casting or extrusion techniques to construct outer walls, these manufacturing processes generally limit the minimum thickness to several millimeters. Because thicker walls tend to increase overall stiffness and thus reduce high frequency plate modes, high thickness values are generally successful at meeting dynamic stiffness requirements. However, these thick walls limit the capability of the manufacturer to reduce the mass of the vehicle, at least via the chassis structures, to achieve other desirable performance gains.

These structures can be created using 3-D printing techniques such as powder bed fusion (PBF). However, even with 3-D conventional printing techniques, thick walls can still be required in chassis structures (e.g., on the order of six millimeters) to attenuate high frequency plate modes and meet dynamic stiffness targets. Like in traditional casting or extrusion techniques, the thickness of the outer walls in chassis structures undesirably adds mass to the vehicle. Higher masses affect maximum achievable performance and the vehicle's energy efficiency, to name a few problems.

An additional downside to 3-D printed chassis structures is that parts are often built with support structures, which are structures that are printed to support portions of the build piece that would otherwise sag, droop, warp, etc. Support structures are removed after the build piece is printed. In many cases, however, support structures can be difficult and costly to remove. While 3-D printing, also known as additive manufacturing (AM), may allow a designer to design a chassis structure in software, practical problems persist in additive manufacturing, such as the wastefulness of support structures and the cost and difficulty of removing support structures. If a designer must add stiffening structures to satisfy dynamic stiffness requirements, the stiffening structures might also require their own support structures, which can compound the problem of removal. In addition, in many cases support structures cannot be removed due to interference with other structures. In particular, in various embodiments of the present disclosure, stiffening structures can include complex and/or enclosed structural arrangements. If support structures are used to support such stiffening structure arrangements, removal of the support structures might be difficult or impossible.

Thus, 3-D printing designs that address dynamic stiffness targets may benefit from aligning or optimizing stiffening structures in a strategic way. For example, stiffening structures such as ribs can be placed in a region of the chassis structure that requires stiffening to mute high plate modes. In various embodiments, if that same region is also part of an overhanging structure that requires support, the ribs may also be designed to serve as support structures for that region of the part during printing. In this way, for example, stiffening structures such as ribs can serve a dual purpose as stiffening structures and support structures to reduce or eliminate the amount of support structures needed. Another way to reduce or eliminate the amount of support structures is to design stiffening structures such that they do not need support structures during printing. In other words, stiffening structures can be designed so that they are self-supporting. Various embodiments disclosed herein include self-supporting stiffening structures.

Accordingly, in an aspect of the disclosure, the outer wall thickness is reduced, and self-supporting internal ribs are designed and printed to provide stiffness of the outer walls, particularly at high modal frequencies of the chassis structure where the walls would otherwise tend to shake and become unstable. In an embodiment, internal ribs are aligned based on a print orientation of a chassis structure. The ribs in this embodiment have at least three benefits. First, they can be used as stiffening structures to meet the desired dynamic stiffness requirements of the part. Second, they are self-supporting, meaning that no other structures are needed to support the 3-D printed ribs during the print job. Third, the ribs can be used to support other parts, including the outer walls that previously relied on separate supporting elements. The need for using any type of support element having a utility limited to the print job itself is obviated. Moreover, using a finite element method or another suitable analysis, the ribs can be selectively added in pockets where needed, rather than placed in arrays all over the part.

These considerations, combined with the use of thin outer walls (in some cases about 1-2 millimeters or less), enable the chassis structure to meet or exceed high frequency dynamic stiffness targets while reducing mass. Further, because the ribs are self-supporting during printing, the need for much of the internal support structures is reduced or eliminated. Post-processing time, in turn, can be substantially reduced because the support structure removal steps are largely eliminated. No additional support structures are needed to print the internal ribs because they are aligned to be self-supporting based on the print orientation of the chassis structure.

In one embodiment, the chassis structure can be 3-D printed such that, if all parts are printed at a 45-degree alignment (or less) in opposing directions relative to the print direction, then support of overhanging walls can be altogether eliminated.

One common use of the chassis structure is in a node. A node is any 3-D printed part that is used to combine two or more parts together, such as tubes, extrusions, panels, or other nodes. The node may be used to provide support against different loads. A node may be found, for example, at the joint in a chassis framework. Further, in addition to connecting parts, nodes may be used for other purposes, including, for example, as crash structures. Using the principles herein, nodes can be manufactured using thin outer walls and selectively designed internal ribs for supporting the outer walls.

FIG. 1 illustrates an external perspective view of a vehicle chassis structure 101 in accordance with an embodiment. Chassis structure 101 is a 3-D printed hollow structure with internal ribs. In an embodiment, the chassis structure 101 is a vehicle node. Chassis structure 101 includes walls 103, which are outer walls defining the external surface of the chassis structure. In other words, walls 103 represent the outer skin of the chassis structure. As such, walls 103 extend around a perimeter of the chassis structure and bound a hollow portion 116 inside the hollow chassis structure 101.

Chassis structure 101 includes internal ribs that contact an inner surface of walls 103 at rib edge lines 102, 104, and 108. In other words, rib edge lines 102, 104 and 108 show the edges of the internal ribs where the internal ribs meet the inner surface of respective walls 103. The internal ribs can be attached to an inner surface of walls 103 during the 3-D printing process, for example. The internal ribs that correspond to rib edge lines like 102, 104 and 108 can extend the full length across hollow portion 116 of the chassis structure 101, that is, the internal ribs can extend from one wall to an opposing wall on the other side of the chassis structure, as shown in more detail in FIG. 2B-D. As an example, while the volume of hollow portion 116 may vary substantially depending on the nature of the chassis structure 101 and on the target specifications for dynamic stiffness, etc., in one exemplary embodiment, the hollow portion is approximately 1000 milliliters. In other embodiments this value could be larger or smaller.

As shown in greater detail below, the ribs can include multiple sets of ribs. Here, each of rib edge lines 102, 104 and 108 belongs to a different set of generally parallel ribs. That is, in this embodiment, each set of ribs includes multiple, parallel ribs, such that each rib in a set intersects with one or more ribs in the other sets. In this way, for example, the intersections of the ribs can provide support to help allow the individual ribs to be self-supporting, and in some embodiments to help the intersecting ribs act as more effective stiffening structures when handling external loads on the chassis structure when the chassis structure is in operation. In other embodiments, additional or different criteria may be used to assist the ribs to be self-supporting as well as to allow the ribs to optimally handle external loads and attenuate high frequency plate modes. For example, placing the intersecting sets of ribs at different angles relative to one another may be another factor helping the ribs to be self-supporting, and/or helping the ribs to act as more effective stiffening structures when handling external loads.

Print orientation 115 is shown to illustrate how the chassis structure and rib edge lines in FIG. 1 are aligned relative to the print orientation, as described further below. In FIG. 1, print orientation 115 is pointed upwards and generally perpendicular to a plane of the upper surface of build plate 307.

Figure 2A:
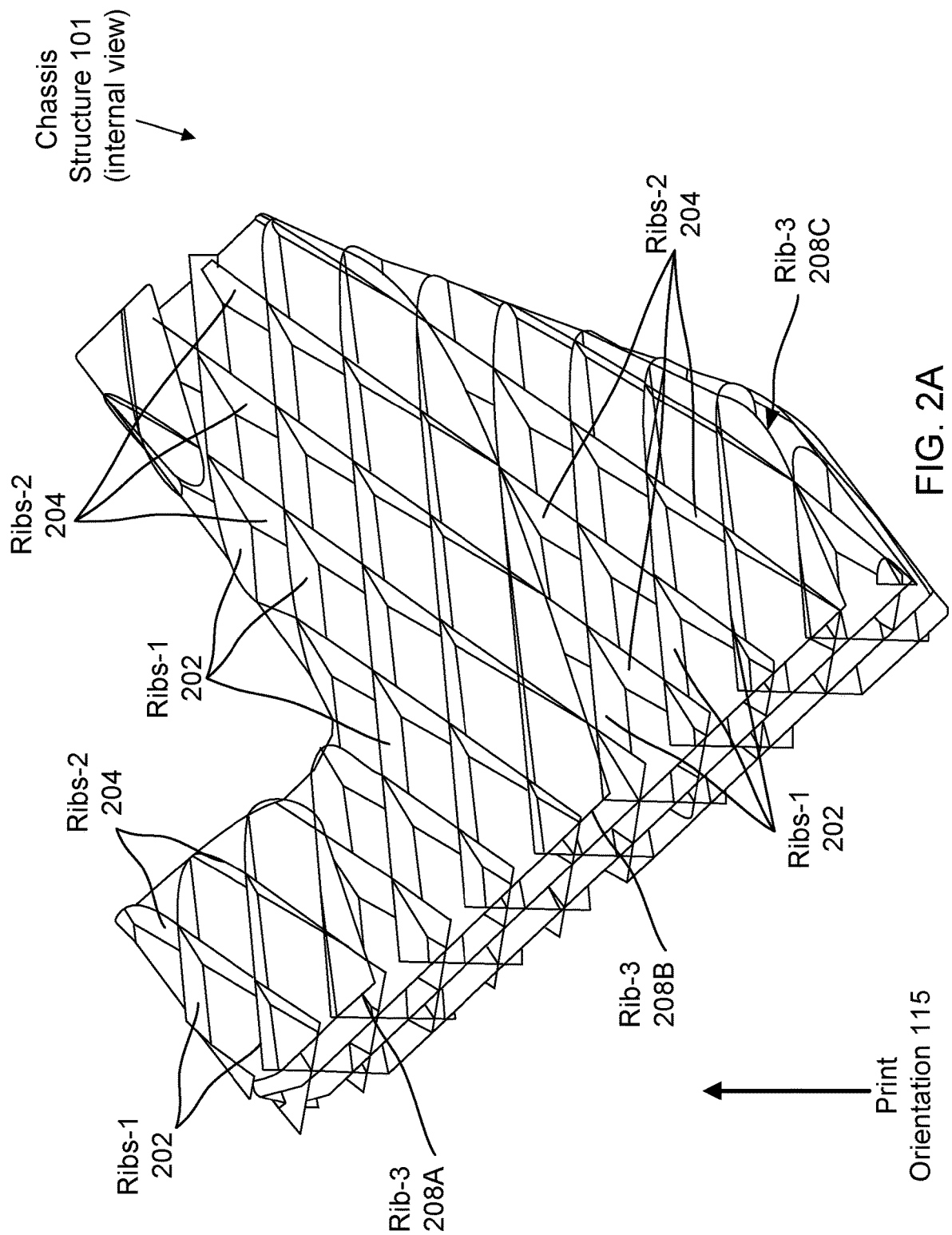
FIG. 2A illustrates a perspective view of the vehicle chassis structure with the outer walls removed.

FIG. 2A illustrates an internal perspective view of the chassis structure 101 of FIG. 1 with the outer walls 103 removed to show details of the ribs within hollow portion 116. In an embodiment, the chassis structure 101 may constitute a node. Chassis structure 101 in FIG. 2A has been topologically optimized via one or more algorithms to produce a node with a reduced mass. FIG. 2A shows a more detailed view of the internal ribs of the chassis structure 101. As indicated in FIG. 1, there exist three different internal rib sets throughout the node. More specifically, the different sets of ribs in FIG. 2A include (i) a first set of parallel ribs (i.e., ribs-1 202) which is positioned in a first direction, (ii) a second set of parallel ribs (i.e., ribs-2 204) which is positioned in a second direction such that the two sets of ribs (i.e. ribs-1 202 and ribs-2 204) intersect each other at a number of different locations throughout the chassis structure 101, and (iii) a third set of ribs (three of which are referenced as rib-3 208A, rib-3 208B and rib-3 208C) which is positioned in a direction that spans across part or all of the first two sets of ribs and therefore intersects the first two sets of ribs (i.e., ribs-1 202 and ribs-2 204) at different locations throughout the chassis structure.

As is evident from FIG. 2A, each of ribs labeled rib-3 208A-C have different lengths, and therefore shorter ribs-3 208A-B do not intersect all of the ribs in the other two sets of ribs. In addition, to avoid unduly obscuring the concepts in FIG. 2A, not all ribs in all sets have been specifically identified by reference number. However, FIGS. 2B-D (below) show each individual set of ribs.

Figure 2B:
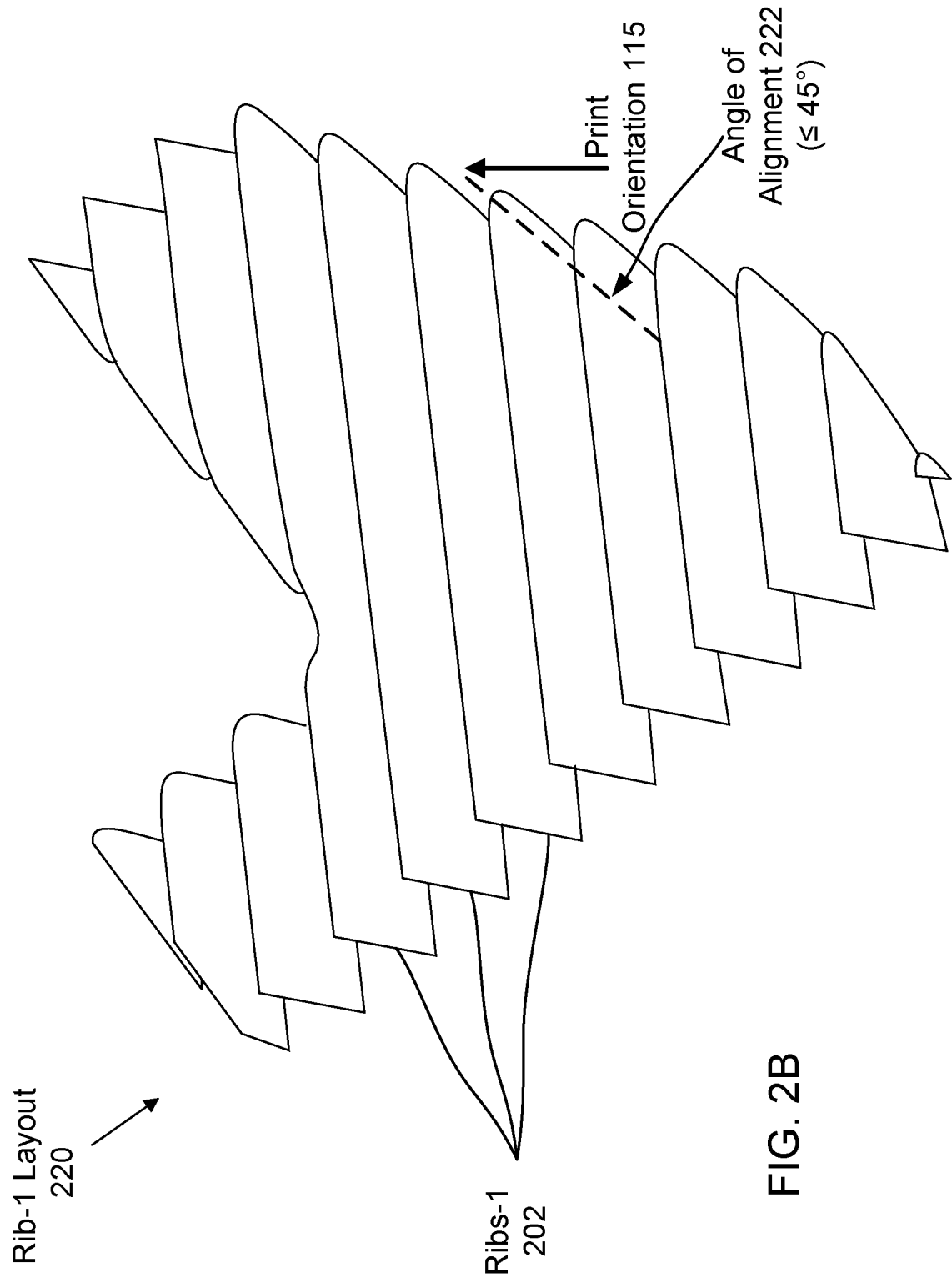
Figure 2C:
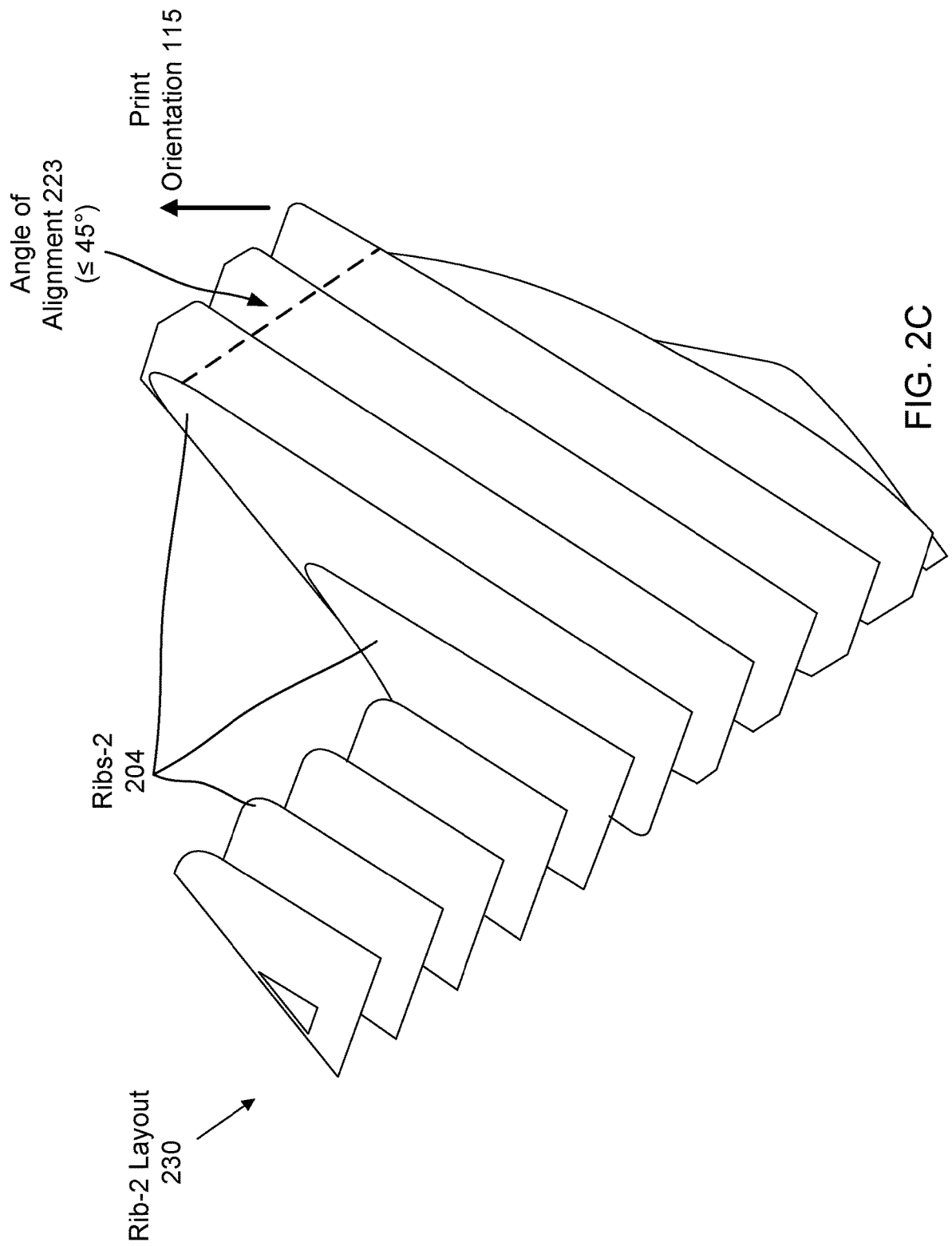

FIGS. 2B-D illustrate perspective views of the three sets of internal ribs of the vehicle chassis structure 101 of FIGS. 1 and 2A. For the purpose of clarity, FIGS. 2B-D show each set of ribs with all other structures removed so that the details of each individual set of ribs can be more easily seen. FIG. 2B illustrates the rib-1 layout 220, which shows the first set of ribs identified in FIG. 2A as ribs-1 202. As is evident from the illustration, the ribs (ribs-1 202) are characterized by a plurality of components arranged in identically-oriented planes. The print orientation 115, that is, the direction in which layers or slices of print material are selectively added and scanned by the electron beam, is straight up and down. In various embodiments as shown in FIG. 2B, the angle of alignment 222 of each of ribs-1 202 is less than or equal to ($\leq$) 45 degrees (45°) relative to print orientation 115. In one embodiment, the angle of alignment 222 is equal to 45 degrees (45°). Accordingly, the first set of ribs (ribs-1 202) is self-supporting, and no support structures are required during 3-D printing.

FIG. 2C illustrates the rib-2 layout 230, which shows the second set of ribs identified in FIG. 2A as ribs-2 204. Like in FIG. 2B, the ribs in FIB. 2C can be characterized by a plurality of components in identically aligned planes. Here too, the angle of alignment 223 is less than or equal ($\leq$) 45 degrees (45°) relative to print orientation 115. Thus, the second set of ribs (ribs-2 204) are likewise self-supporting, and require no support structures during 3-D printing.

FIG. 2D illustrates the rib-3 layout 240, which shows the third set of ribs identified in FIG. 2A as including the three ribs labeled ribs-3 208A-C. FIG. 2D shows also the remaining ribs (i.e., ribs-3D-G) in the third set. As in the first two sets, each of the ribs (ribs-3 208A-G) in the third set is shaped differently, but the ribs are oriented in parallel planes. Here too, the angle of alignment is less than or equal ($\leq$) 45 degrees (45°) relative to print orientation 115. It should be noted that in the perspective of this figure, the angle of alignment is angled into the page, and therefore is not shown, in order to avoid confusion. However, one skilled in the art will readily understand the angle of alignment of ribs is less than or equal ($\leq$) 45 degrees (45°) relative to print orientation 115. Thus, the second set of ribs (ribs-3 208A-G) are likewise self-supporting, and require no support structures during 3-D printing.

Referring back to FIG. 2A, ribs-1 202 are shown as intersecting ribs-2 204, which in turn creates a plurality of 'diamond shaped' pockets in the chassis structure 101. Likewise, each rib-3 208 cuts at least partially through one or more ribs in the first two sets of ribs (i.e., ribs-1 202 and ribs-2 204) to create additional pockets in lower planes of the chassis structure 101.

Producing a plurality of ribs in the third set (i.e., each rib-3 208) can be used to further support the first and second sets of ribs (i.e. ribs-1 202 and ribs-2 204). This added support can enable chassis structure 101 to use only self-supporting ribs to act as stiffening structures that meet dynamic stiffness requirements while concurrently minimizing the mass of the chassis structure 101. Chassis structure 101 is for illustrative purposes only, and other chassis structures, such as other nodes, may use fewer or more ribs in each set of ribs, as necessary, to accomplish its target goals. In addition, while three sets of ribs are shown in FIG. 2A, in other embodiments a different number of sets of ribs is also possible. Referring still to FIG. 2A-D, it can be appreciated that eliminating the requirement of supports in the 3-D printing also minimizes post-processing time, at least because there are no support structures that require separation and removal. Further, the wall thickness can be dramatically reduced—on the order of 1 to 2 millimeters or less—when using 3-D printing as compared to the current casting or extrusion techniques commonly used to make these types of chassis structures.

One advantage of the chassis structure 101 is that each of the ribs in all three sets is self-supporting. Further, in various embodiments, each of the ribs can be used as stiffening structures for attenuating high plate nodes, without any rib in the chassis structure 101 being used solely for supporting a wall during 3-D printing. Further, because the ribs may be used also to support the walls 103 during 3-D printing concurrent with their use as stiffening structures when in operation, the use of the self-supporting ribs effectively eliminates the need for external support structures, e.g., to support the walls 103 during 3-D printing. Another advantage of the chassis structure 101 in FIG. 1 (and further disclosed in FIGS. 2A-D) is that the mass of the chassis structure 101 can be dramatically reduced due to the thinner walls that can be used (e.g., 1-2 millimeters (mm) or less). The number, thickness and orientation of the ribs may also be optimally selected to minimize overall mass of the chassis structure 101. For example, the ribs can in various embodiments be made with a thickness of about 1-4 millimeters (mm), or less.

Figure 3:
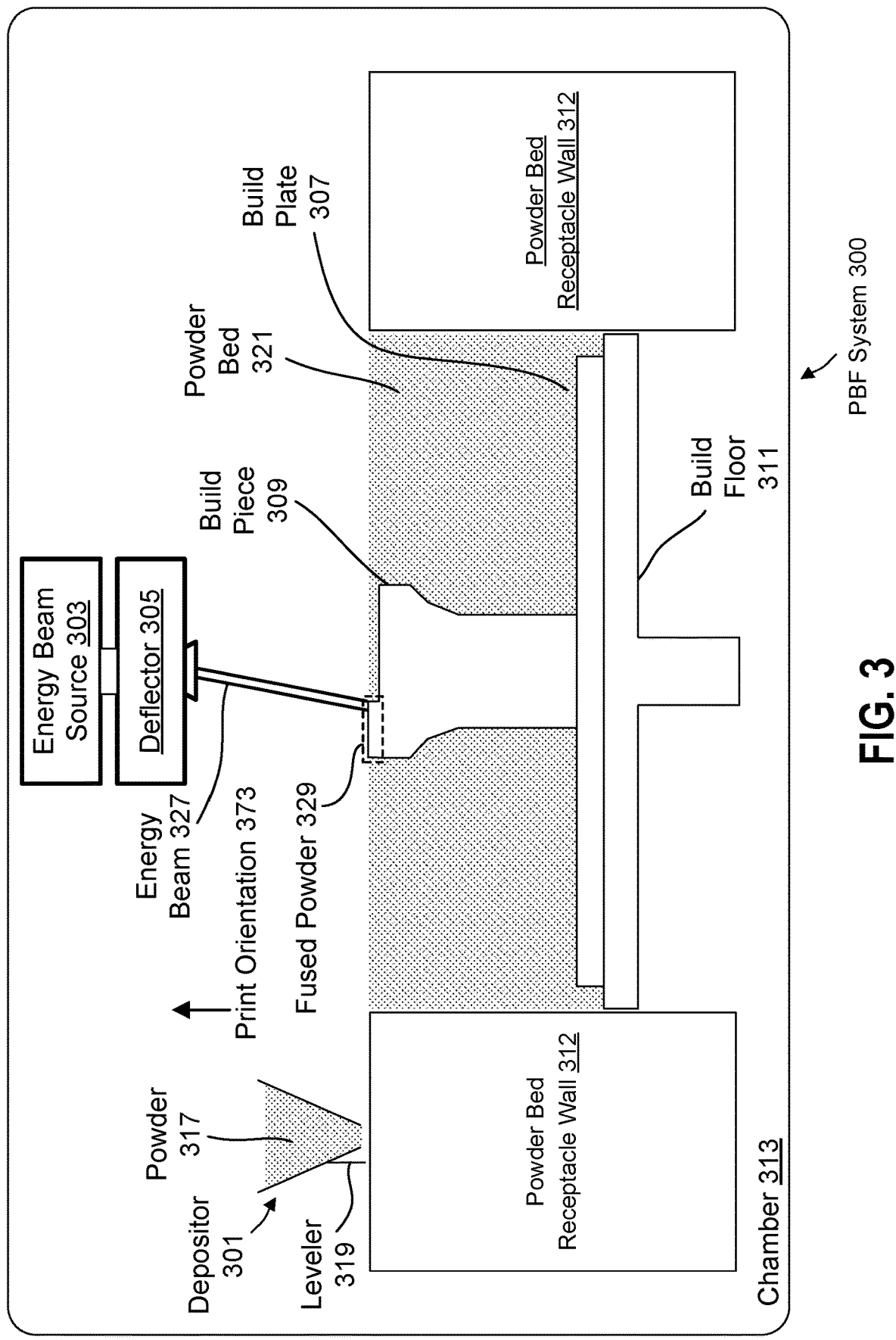
FIG. 3 illustrates an exemplary view of a print orientation of a powder bed fusion (PBF) 3-D printer.

FIG. 3 illustrates an exemplary view of a print orientation of a powder bed fusion (PBF) 3-D printer. In various embodiments, the PBF system 300 may include a build floor 311, a build plate 307 upon which to form a build piece 309 such as a 3-D printed chassis structure, and a powder bed 321 contained by one or more powder bed receptacle walls 312 (shown as a cross section in this view for illustrative purposes). Shown above the left powder bed receptacle wall 312 is a depositor 301 filled with a powder 317 (e.g., a metal powder or alloy for use as a print material), and a leveler 319 which may include a specially-shaped blade or roller for smoothing and evening out the deposited powder. During a re-coat cycle, the depositor 301 deposits powder 317 into the powder bed 321, and the leveler crosses the powder bed from left to right at least once to smooth out a layer of the powder. The depositor 301 may return to the left side before a print cycle begins. Shown above the powder bed are an energy beam source 303 (such as a laser or electron beam), a deflector 305 to steer the beam, and energy beam 327 (which is off during the re-coat cycle). During the print cycle, the energy beam source 303 selectively fuses portions of the deposited powder layer to form fused powder 329, which solidifies to form a cross-section of the build piece 309. The re-coat cycle then adds another layer, followed by the print cycle which selectively fuses the newly added layer, and so on until the build piece 309 is completed.

Of particular note in FIG. 3 is that the print orientation 373 for purposes of the exemplary PBF printer is in the direction of the vertical arrow annotated "Print Orientation 373". Thus, to ensure that the chassis structure is properly aligned in the PBF printer, the data model that includes the initial model of the chassis structure should ensure that the print orientation 373 is properly aligned with the components of the build piece 309 to ensure that the resulting build piece 309 is free of a requirement of support structures.

It should be understood that, while a PBF printer is being used to produce the chassis structure for purposes of this illustration, in other applications another type of printer may be used without departing from the spirit and scope of the present disclosure.

Figure 4:
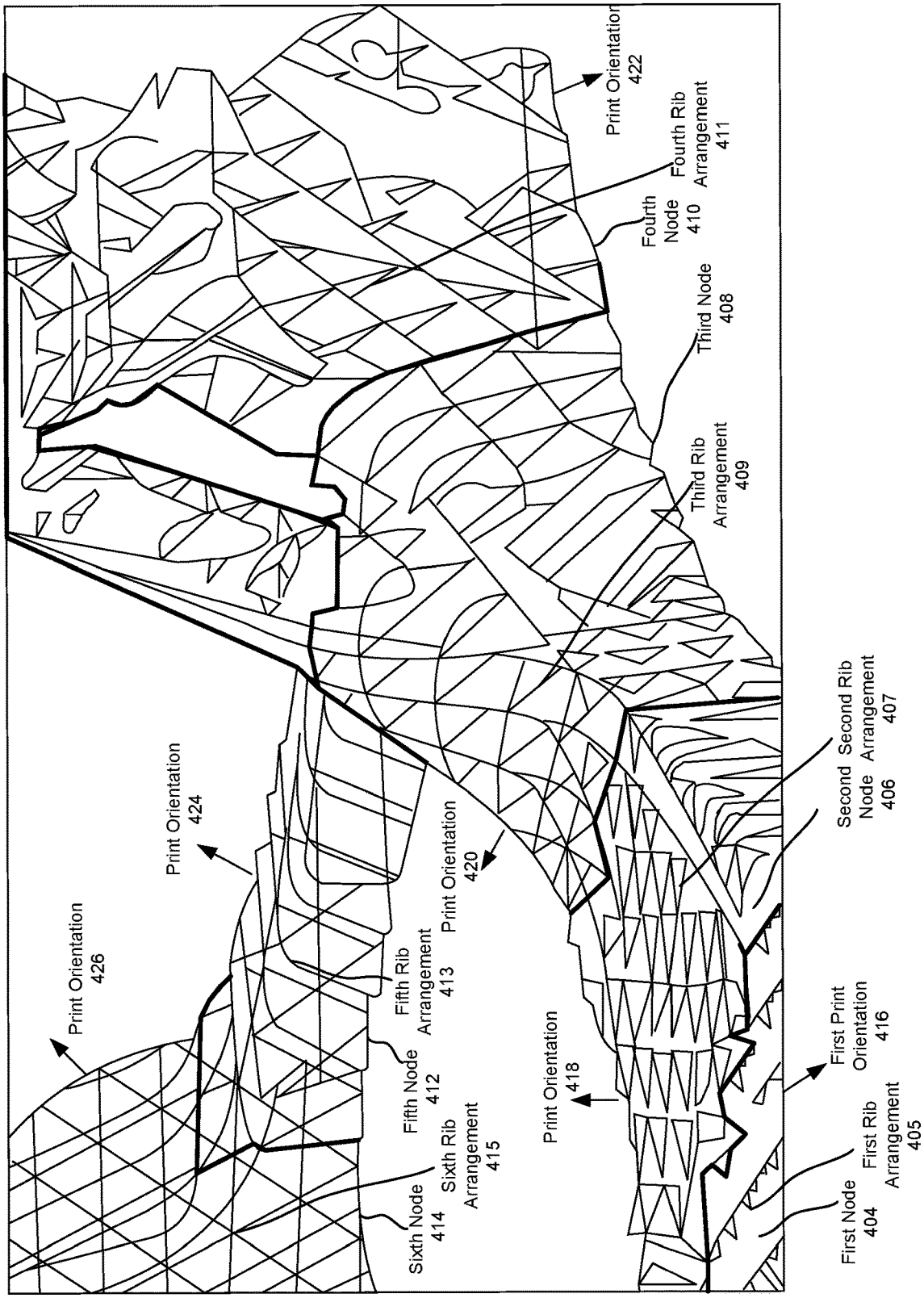
FIG. 4 illustrates a perspective view of a combination of nodes used in a frame of a vehicle chassis.

FIG. 4 illustrates a perspective view of a plurality of nodes in a frame of a vehicle chassis. FIG. 4 may, for example, represent a portion of the rear frame of the vehicle chassis. In various embodiments, the vehicle chassis may include chassis structures that represent a plurality of nodes, a plurality of non-nodes, or some combination thereof. In this embodiment, in which multiple nodes are combined into the frame, one or more of the nodes has a print orientation that does not align with the print orientation of one or more other nodes. FIG. 4 shows six nodes for illustrative purposes, although the disclosure is not so limited. FIG. 4 shows, in particular, a first node 404 with a first arrangement of ribs 405, a second node 406 with a second arrangement of ribs 407, a third node 408 with a third arrangement of ribs 409, a fourth node 410 with a fourth arrangement of ribs 411, a fifth node 412 with a fifth arrangement of ribs 413, and a sixth node 414 with a sixth arrangement of ribs 415. Each of the nodes has a print orientation represented by arrows in FIG. 4, for example, a print orientation 416 of first node 404, a print orientation 418 of second node 406, a print orientation 420 of third node 408, a print orientation 422 of fourth node 410, a print orientation 424 of fifth node 412, and a print orientation 426 of sixth node 414. For simplification, the nodes are separated by the bolded lines.

In this embodiment, the print orientation of one of the nodes, for example print orientation 418 of second node 406, is not aligned with the print orientation of another one of the nodes, for example print orientation 420 of third node 408. Therefore, the self-supporting ribs printed in second node 406 can have a different arrangement than the self-supporting ribs in third node 408.

The previous description is provided to enable any person skilled in the art to practice the various aspects described herein. Various modifications to these exemplary embodiments presented throughout this disclosure will be readily apparent to those skilled in the art. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A three-dimensional (3-D) printed chassis structure, comprising:
   a wall bounding a hollow portion of the printed chassis structure; and
   a plurality of self-supporting stiffening structures coupled to an inner surface of the wall of the printed chassis structure along a plurality of corresponding edge lines,
   wherein each of the plurality of self-supporting stiffening structures extends a full distance across the hollow portion in a plane defined by its corresponding edge lines, and
   wherein the plurality of self-supporting stiffening structures comprises a first parallel set of stiffening structures, a second parallel set of stiffening structures that intersects the first parallel set, and a third parallel set of stiffening structures that intersects the first parallel set and the second parallel set.

2. The 3-D printed chassis structure of claim 1, wherein a volume of the hollow portion is at least 1000 milliliters (ml).

3. The 3-D printed chassis structure of claim 1, wherein the chassis structure comprises a vehicle chassis.

4. The 3-D printed chassis structure of claim 1, wherein the chassis structure comprises a component in a rear frame of a vehicle.

5. The 3-D printed chassis structure of claim 1, wherein the plurality of self-supporting stiffening structures comprises members for supporting the wall during both 3-D printing and subsequent use of the structure.

6. The 3-D printed chassis structure of claim 1, wherein the chassis structure is 3-D printed using a powder bed fusion (PBF) 3-D printer.

7. The 3-D printed chassis structure of claim 1, wherein the plurality of self-supporting stiffening structures is configured to fully support the wall during 3-D printing.

8. The 3-D printed chassis structure of claim 1, wherein a number of the plurality of self-supporting stiffening structures comprises a value that achieves a dynamic wall stiffness for a thickness of the wall.

9. The 3-D printed chassis structure of claim 1, wherein a mass of one or more of the plurality of self-supporting stiffening structures comprises a value that achieves a dynamic wall stiffness for a thickness of the wall.

10. The 3-D printed chassis structure of claim 1, wherein a thickness of the wall is less than or equal to two (2) millimeters (mm).

11. The 3-D printed chassis structure of claim 1, wherein the plurality of self-supporting stiffening structures each comprises a thickness in the range of 1-4 millimeters (mm).

12. The 3-D printed chassis structure of claim 1, wherein the chassis structure comprises a node for use in a vehicle.

13. A three-dimensional (3-D) printed chassis structure, comprising:
   a plurality of nodes, each node comprising:
      a wall bounding a hollow portion of the structure; and
      a plurality of self-supporting stiffening structures coupled to an inner surface of the wall of the node along an edge line of a plurality of edge lines,
   wherein each of the plurality of self-supporting stiffening structures extends a full distance across the hollow portion of the node in a plane defined by its corresponding edge lines, and
   wherein the plurality of self-supporting stiffening structures comprises a first parallel set of stiffening structures, a second parallel set of stiffening structures that intersects the first parallel set, and a third parallel set of stiffening structures that intersects the first parallel set and the second parallel set.

14. The 3-D printed chassis structure of claim 13, wherein a print orientation of a first node of the plurality of nodes is misaligned with the print orientation of a second node of the plurality of nodes.

15. An additively manufactured hollow chassis structure, comprising:
   a skin having an external surface, an inner surface, and a hollow volume bounded by the skin; and
   a plurality of self-supporting structures coupled to the inner surface of the skin along a plurality of corresponding edge lines, such that at least one self-supporting structure of the plurality of self-supporting structures extends across at least a portion of the hollow volume of the skin to support the skin at a desired dimension of the printed chassis structure,
   wherein the plurality of self-supporting structures enclose areas of the printed chassis structure, and
   wherein the plurality of self-supporting stiffening structures comprises a first parallel set of stiffening structures, a second parallel set of stiffening structures that intersects the first parallel set, and a third parallel set of stiffening structures that intersects the first parallel set and the second parallel set.

16. The additively manufactured hollow chassis structure of claim 15, wherein the plurality of self-supporting structures is configured to fully support the wall during 3-D printing.

17. The additively manufactured hollow chassis structure of claim 15, wherein a number of the plurality of self-supporting structures comprises a value that achieves a dynamic wall stiffness for a thickness of the wall.

* * * * *